Sept. 23, 1941.  G. HUNT  2,256,712
CLUTCH DRIVEN PLATE
Filed Feb. 9, 1939
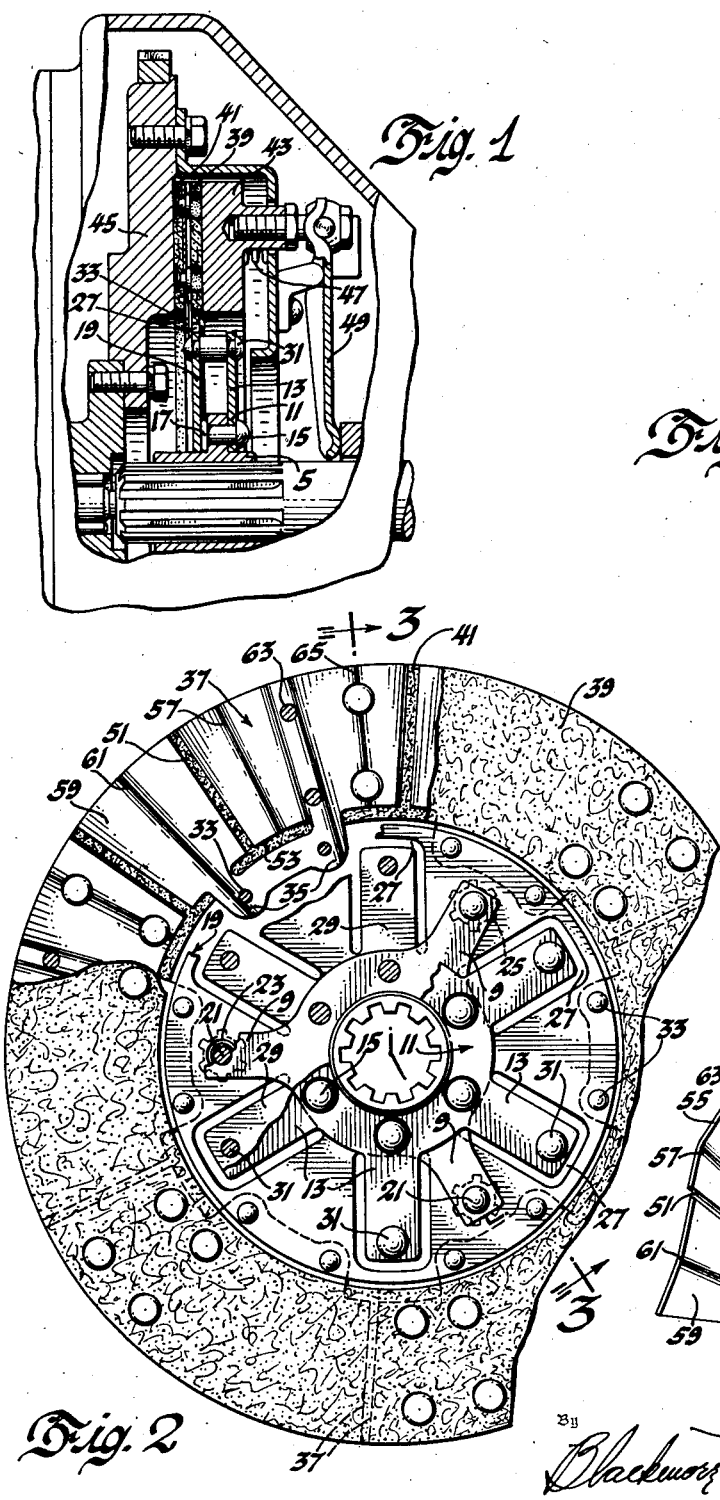
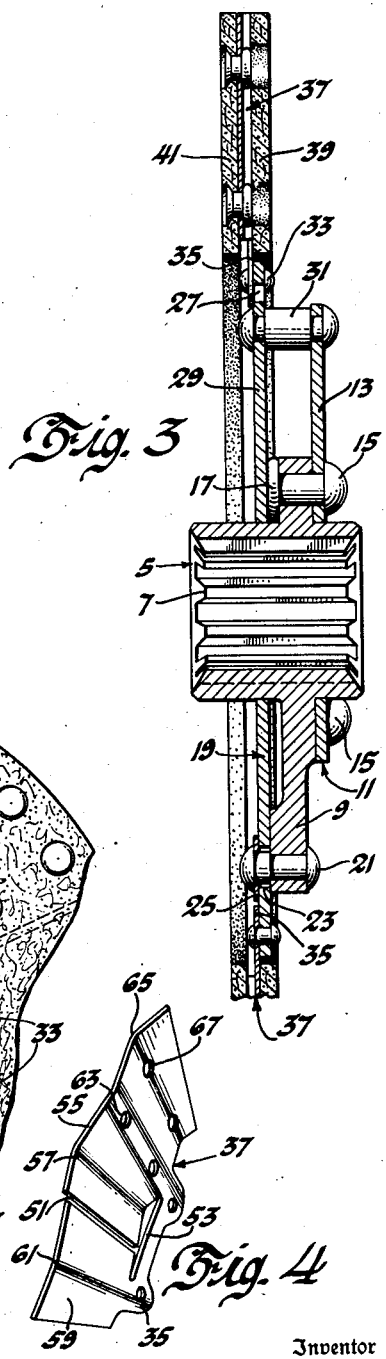
Inventor
George Hunt
By
Blackmore, Spanier & Hunt
Attorneys Patented Sept. 23, 1941

2,256,712

UNITED STATES PATENT OFFICE 2,256,712

CLUTCH DRIVEN PLATE

George Hunt, Dayton, Ohio, assignor to General Motors Corporation, Detroit, Mich., a corporation of Delaware Application February 9, 1939, Serial No. 255,463

2 Claims. (Cl. 192—107)

This invention relates to friction clutches and is the outgrowth of an effort to improve the driven member of the clutch of a motor vehicle.

An object of the invention is a driven plate so constructed as to provide resiliency through which the driving torque is transmitted between the marginal portion and the hub portion of the driven member.

Another object is to provide axial resiliency to resist reengagement subsequent to clutch release to thereby secure a smooth engagement and avoid a grabby clutch.

As another object the invention aims to reduce spinning inertia to thereby lessen the load on the synchronizing members of the transmission which is associated with the driven parts of the clutch.

Other objects include the attainment of the above major objects by structure which is highly efficient but yet comparatively inexpensive and easy to assemble.

One embodiment of the invention is shown in the accompanying drawing in which

Figure 1 is a transverse section through the improved clutch.

Figure 2 is a view in elevation of the driven member, the driven member being partly broken away to better illustrate the parts thereof.

Figure 3 is a section substantially as shown by line 3—3 of Figure 2.

Figure 4 is a perspective of a detail.

The driven member of the clutch includes a hub 5 splined at 7 for mounting on a clutch driven shaft. This hub is formed with radially extending arms 9, preferably three in number and arranged symmetrically. On one side of the hub flange is a spring plate 11 from the hub portion of which extend six symmetrically arranged arms 13, there being two such arms between each two adjacent hub arms 9. Rivets 15 having flattened heads 17 secure the spring plate 11 to the hub. On the side of the hub flange opposite spring plate 11 is what may be called the driven plate 19. It is not riveted to the central part of the hub but is rotatably supported by the hub and engages the heads 17 of the rivets 15. This driven plate is, however, riveted to the ends of the arms 9 of the hub. Shouldered rivets 21 serve to connect these parts. The openings in the arms 9 fit the rivets but the rivet openings 23 in the driven plate are enlarged and permit a limited relative circumferential movement between the driven plate and the hub. Spring washers 25 are placed between the heads of the rivets and the face of the driven plate. Two U-shaped slots 27 are formed in the driven plate between each two adjacent points of attachment with the arms 9 of the hub, these slots forming radial tongues 29 which are disposed axially of the spring arms 13. Shouldered rivets 31 connect the outer ends of the equally dimensioned arms and tongues. Because of this construction the relative circumferential movement between the driven plate and the hub is resisted by a twisting along radial lines of the arms 13 and 29.

Attached by rivets 33 to the marginal region of the driven plate 19 are tabs 35 of segmental plates 37 which plates are made from relatively light spring steel. These plates carry the facings 39 and 41 for engagement with the pressure plate and flywheel. The drawing identifies the pressure plate by numeral 43 and numeral 45 is applied to the flywheel. One of the clutch engaging springs is shown at 47 and the releasing mechanism is designated as a whole by numeral 49. It is unnecessary to describe these parts in detail. Each spring segment 37 is formed with a radial slot 51 terminating in a circumferential slot 53. The wing part 55 formed by the radial slot and one end of slot 53 is bent from the plane of the plate to form a radially extending region 57 which is directed toward one clutch facing, the one which is to be attached to the left of the segment shown in Figure 4. The end portion 59 circumferentially beyond the region defined by the rivets 33 is also bowed from a radial line 61 which is in the plane of the plate, the end of this bent portion adapted to engage the previously mentioned facing. These bowed portions are to be flattened into the plane of the segment when the clutch is engaged. To the right of wing 55 (Figure 4) the segment extends radially within the plane of the segment, the plane of the tab. This radially extending region has rivet openings 63 for securing the right hand facing. Beyond the region identified by openings 63 the plate is bent from the plane of said region in a way corresponding to the bent portion 55. Its ridge 65 has openings 67 for attaching the segment to the left hand facing. The facing attached at 63 also contacts with the ridge 61, these ridges lying in the plane of the plate. The facing to the left of the segment attached at 67 also contacts with ridge 57. The facings are therefore normally spaced axially and when the clutch engages the facing carried by the rivets at 67 approaches the other facing and the several bends of the segment flatten into the plane of the segment.

The construction above described accomplishes the objectives set forth above. The axial twisting of the arms and tongues 18 and 28 function to cushion the transmitted torque. The segments 37 which carry the facings provide the axial resiliency which opposes the clutch engaging action of the main springs 47. The results are accomplished by the use of stamped plates. The segments are separable parts of the driven plate and may, if desired, be made from lighter stock in order to reduce the spinning inertia of the driven member. The parts are relatively inexpensive and easily assembled.

I claim:

1. In a clutch, a driven member comprising a disc, spring segments having tabs secured to the periphery of said disc, each segment having end portions circumferentially beyond its tabs, said end portions being bent away from a first side of said plate, one of said ends forming a radially extending facing securing ridge, said segment in the region radially outward from its tabs having radial and circumferential slots, a tongue bent from said slots and extending away from said first side, said tongue forming a second ridge in the plane of the first mentioned ridge, facings secured to opposite sides of said segment, one to the side of the segment adjacent the first mentioned side of the plate, the other to the second side at one of said ridges.

2. The invention defined by claim 1, one of said bent ends having an extension beyond the ridge thereof deflected back towards said first mentioned side.

GEORGE HUNT.